United States Patent [19]
Takahashi et al.

[11] Patent Number: 5,670,201
[45] Date of Patent: Sep. 23, 1997

[54] LOW ALLERGENIC NUTRIENT COMPOSITION AND METHOD OF USING SAME

[75] Inventors: Nobuaki Takahashi, Kawagoe; Sadao Asakawa, Tokyo; Shun-Ichi Dousako, Urawa; Tadashi Idota, Kawagoe, all of Japan

[73] Assignee: Snow Brand Milk Co., Ltd., Sapporo, Japan

[21] Appl. No.: 505,451

[22] Filed: Jul. 21, 1995

Related U.S. Application Data

[63] Continuation-in-part of Ser. No. 234,621, Apr. 28, 1994, abandoned.

[30] Foreign Application Priority Data

Jun. 21, 1995 [JP] Japan .................. 7-17723511991

[51] Int. Cl.$^6$ .................................................. A23L 1/305
[52] U.S. Cl. .................. 426/648; 426/656; 426/657; 426/804
[58] Field of Search ................. 426/656, 72, 80, 426/580, 648, 657, 804, 583, 540, 634, 533; 530/360, 322, 361, 395

[56] References Cited

U.S. PATENT DOCUMENTS

5,075,424  12/1991  Tanimoto et al. .............. 530/322
5,147,853   9/1992  Dosako et al. ................. 530/322

FOREIGN PATENT DOCUMENTS

58-165742  9/1983  Japan ........................... 426/583

OTHER PUBLICATIONS

Winton et al. The Structure and Composition of Foods, vol. III, 1937, John Wiley & Sons, Inc. p. 85.

Patent Abstracts of Japan, vol. 14, No. 475 (for Japan Kokai 02-195850) Published Oct. 17, 1990 (from PTO APS).

Patent Abstracts of Japan, vol. 13, No. 249 (for Japan Kokai 01-55143), Published Jun. 9, 1989 (from PTO APS).

*Primary Examiner*—Anthony J. Weier
*Attorney, Agent, or Firm*—Whitham, Curtis, Whitham, McGinn

[57] ABSTRACT

A novel and low allergenic nutrient composition is discribed. The composition contains Kappa-caseinglycomacropeptide and, optionally, one or more other amino acid sources selected from amino acids, peptides, or proteins, as nitrogen sources. The nutrient composition provides a favorable taste, no allergenicity, a high nutritive value, good absorptivity and digestibility, and a superior antiinfective effect. It can be served as formulas, enteral feeding nutrients, tube feeding nutrients, or nutritious supplements.

2 Claims, 1 Drawing Sheet

LOW ALLERGENIC NUTRIENT COMPOSITION AND METHOD OF USING SAME

CROSS REFERENCE TO RELATED APPLICATIONS

This application is a continuation-in-part (CIP) of the patent application having Ser. No. 08/234,621 filed Apr. 28, 1994 now abandoned and that application is herein incorporated by reference.

BACKGROUND OF THE INVENTION

1. Field of the Invention

The present invention generally relates to a low allergenic nutrient composition with an improved amino acid composition which comprises Kappa-caseinglycomacropeptide (hereinafter abbreviated as GMP), as a nitrogen source, and, optionally, amino acids and peptides.

2. Background Description

Allergy, particularly food allergy, is an allergic disease frequently suffered by an infant. Its increase is remarkable in recent years. Currently, only basic therapeutic method for food allergy is eliminating food allergens from foods. In Japan, three major sources of food allergens are milks, eggs, and soybeans. Since they are inexpensive foods containing abundant proteins and are consumed by a number of people in significant amounts, removing them from everyday meals poses serious nutritious and economical problems to families of which members are suffering from allergy. In particular, removal of milks, eggs, and soybeans from meals of infant under the growth ages presents a serious problem from the aspect of the dietetics.

Therefore, there is a strong desire for the development of nutrient foods which are free from or do not possess allergenicity, to be supplied to allergy patients.

Conventionally, goat milks, milks from animal meat, soybean milks, and the like have been supplied to allergy patients as allergen-free foods. However, they have drawbacks.

Goat milks are unsuitable for infant, by whom a majority of allergy patients is occupied, due to their nutrient compositions. Furthermore, goat milks are reported to be absolutely undesirable to be supplied to cow milk allergy patients, particularly to infant patients, because of the cross-reactivity between goat milk proteins and cow milk proteins (Food Intolerance in Infancy Allergology, Immunology, and Gastroenterology, edited by Robert N. Hamburger, Vol. 1, 253–265, Raven Press (1989)).

The book also reports the unsuitability of supplying milks made from meats to cow milk allergy patients because of the cross-reactivity between proteins constituting the meats and cow milk proteins, even though milks made from such meats are manufactured and sold.

Soybean milks have been recommended as a good substitute of cow milk in many countries in America and Europe. In Asian countries, including Japan, however, many food allergy patients are allergic to soybean because of customary feeding of soybean in these areas. Furthermore, because of the high allergenicity of soybean, food allergy patients who are not allergic to soybean are reported to become allergic to soybean (Yamashita et al., Pediastrial MOOK, 48, 228–241 (1987)).

Because of these reasons nutrient compositions comprising amino acids or peptides as nitrogen sources are commercially sold. They also have some drawbacks. That is, formulas and nutrient compositions using only free amino acids as a nitrogen source impart unpleasant tastes and odors due to the free amino acids, preventing them from being taken by patients for a prolonged period, and are digested or absorbed insufficiently due do their high osmotic pressure, even though they are theoretically free from allergenicity (Nonomura, et al., Allergy Clinics, 9, 1035 (1989)).

Formulas comprising peptides with reduced allergenicity obtained by hydrolyzing proteins derived from cow milks or soybeans with enzymes are manufactured and commercially available. Such formulas also have a problem of unpleasant tastes and odors due to amino acids or peptides produced by the hydrolysis of proteins, which precludes such products from being taken by the patients continuously for a long period of time. In addition, the allergenicity is not always completely eliminated from such formulas. Reducing the problem of the unpleasant odors and tastes by decreasing the extent of hydrolysis would result in insufficient elimination of the allergenicity. On the other hand, a greater degree of hydrolysis impairs the odors and tastes even more (Arita et al., Allergy Clinics, 9, 1030 (1989)).

Food substituents to be supplied to food allergy patients, including typically milk allergy patients, must be free from allergenicity or must possess sufficiently low allergenicity, must have good taste and flavor, must be highly nutritious with excellent digestibility and absorptivity, and must be adaptable to long term intake by patients. These requirements, however, are contradictory each other according to the current technological level. No nutrient compositions nor low allergenic formulas satisfying all above requirements have been developed heretofore. The absence of such nutrient compositions is a serious problem in view of the recent tendency of increasing numbers of food allergy patients. Development of a novel low allergenic nutrient composition has therefore been strongly desired.

SUMMARY OF THE INVENTION

The present inventors have undertaken extensive studies in order to develop a nutrient composition having low or no allergenicity satisfying all of the aforementioned requirements, and found that GMP derived from cow milks exhibited no allergenicity at all. The present inventors were successful in developing a nutrient composition comprising GMP as a nitrogen source.

Accordingly, an object of the present invention is to provide a low allergenic nutrient composition comprising Kappa-caseinglycomacropeptide as a nitrogen source.

In a preferred embodiment of the present invention, the low allergenic nutrient composition comprises, in addition to Kappa-caseinglycomacropeptide, at least one member selected from the group consisting of amino acids and peptides as nitrogen sources.

In another preferred embodiment of the present invention, said amino acid is one or more amino acids selected from the group consisting of L-leucine, L-lysine, methionine, L-cysteine, L-cystine, phenylalanine, Ltyrosine, L-tryptophan, L-arginine, L-histidine, L-valine, L-isoleucine, and glycine.

Other and further objects, features and advantages of the present invention will appear more fully from the following description.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF A PREFERRED EMBODIMENT OF THE INVENTION

Figure 1:
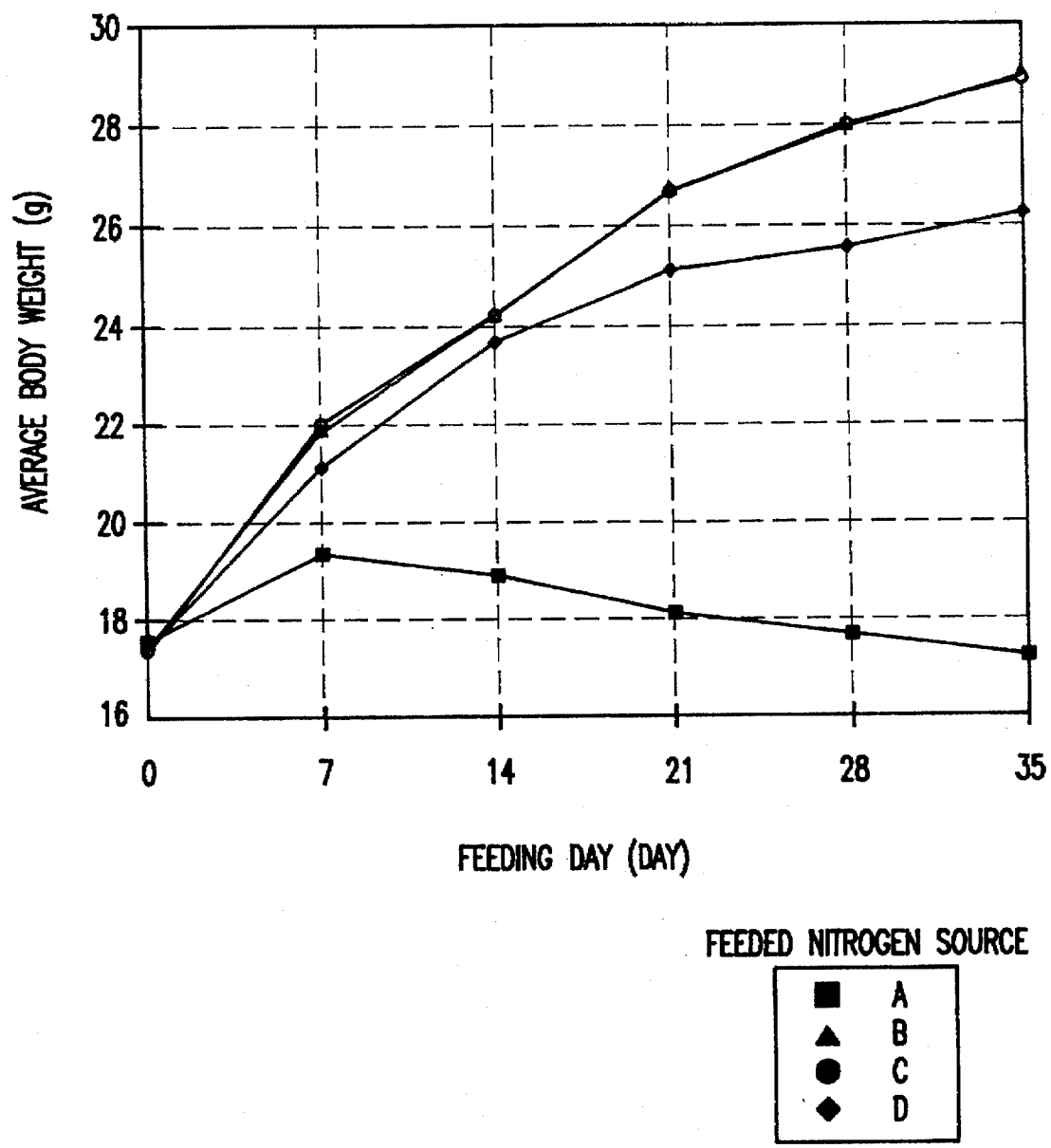
FIG. 1 is a graph of the growth curve of four groups of mice combining nitrogen source of diet, average weight, and feeding day.

In the present invention, "low allergenic" means a characteristic of a compound or a composition having a low allergenicity or no allergenicity at all.

GMP is a known sialic acid-bound peptide produced when Kappa casein is reacted with rennet or pepsin. It can be manufactured in a large scale from milk by the method of Tanimoto et al. (Japanese Patent Laid-open (ko-kai) No. 276542/1990) or by the method of Dosako et al. (Japanese Patent Laid-open (ko-kai) No. 284199/1988).

GMP is a compound with no taste nor odor, very stable against heat, and abundantly soluble. Since it is produced from casein as a raw material, it does not contain milk serum proteins such as β-lactoglobulin and the like, which frequently cause problems relating to cow milk allergy. GMP has a high molecular weight of about 9,000. It not only has an osmotic pressure lower than free amino acid and peptide for the equivalent mount of nitrogen, but also exhibits an action similar to a surfactant when a nutrient composition containing lipids is prepared using it as a raw material. Thus, the use of GMP reduces a problem of emulsion formation by lipids encountered in the manufacture of nutrient compositions from peptides or free amino acids. The above characteristics of GMP are of great advantage in the manufacture of low allergenic nutrient compositions from GMP. Another favorable characteristic of GMP is its superior capability against infection by microorganisms and viruses. An infection inhibitive effect of a nutrient composition from GMP is thus expected.

GMP has an amino acid composition given in Table 1 below.

TABLE 1

| Amino Acid | Content (g/GMP 100 g) |
|---|---|
| Asp | 8.7 |
| Thr | 15.3 |
| Ser | 7.9 |
| Glu | 21.0 |
| Pro | 11.5 |
| Gly | 1.1 |
| Ala | 5.4 |
| Cys | 0.0 |
| Val | 7.5 |
| Met | 0.4 |
| Ile | 9.5 |
| Leu | 3.3 |
| Tyr | 0.3 |
| Phe | 0.7 |
| Lys | 5.9 |
| His | 0.5 |
| Trp | 0.0 |
| Arg | 1.0 |

GMP contains several essential amino acids only in a very small amount. Some essential amino acids are not contained in GMP at all. For the administration for a short period of time, it is possible to give allergic patients a low allergenic nutrient composition containing nitrogen sources derived only from GMP. However, if the composition is to be given for a long period of time, it should contain other amino acid sources selected from free amino acids and peptides so that it may have a nutritionally balanced amino acid composition depending on the age of the allergic patient to whom it is supplied.

Besides amino acids and peptides other components such as protiens, carbohydrates, lipids, emulsifiers, vitamins, minerals, and the like may optionally be incorporated into the nutrient composition of the present invention. In formulating the composition of the present invention, care should be taken so that its osmotic pressure and allergenicity do not unduly increase. In particular, nutrient compositions to be administered to babies should be formulated so that its amino acid composition is equivalent to or as near as mother milk. Specifically, it is desirable that one or more of the following amino acids be incorporated together with GMP; L-leucine, L-lysine, methionine, L cysteine, L-cystine, phenylalanine; L-tyrosine, L-tryptophan, L-arginine, L-histidine, L-valine, L-isoleucine, and glycine.

The nutrient composition of the present invention thus prepared can be served as formulas, enteron feeding nutrients, tube feeding nutrients, nutritious supplements, and the like.

The nutrient composition thus prepared gives a good taste and favorable odor; it is not allergenic, highly nutritious, well absorbed and digested. In addition, it exhibits a superior anti-infective effect due to GMP. Thus, it is a novel low allergenic nutrient composition.

Other features of the invention will become apparent in the course of the following description of the exemplary embodiments which are given for illustration of the invention and are not intended to be limiting thereof.

EXAMPLES

Example 1

One (1) kg of whey protein concentrate (WPC) derived from cheese whey was dissolved into 50 l of water at 50° C. The solution was adjusted to pH 3.5 by the addition of 35% hydrochloric acid. The solution was passed through a UF device (Module 36 type, manufactured by DDS) equipped with an ultrafiltration membrane (61 pp: trademark, a product of DDS) having a fractional molecular weight of 20,000, while operating the UF device at a liquid temperature of 50° C. and pressure of 0.4 Mpa to obtain 10 l of concentrate and 40 l of permeated solution. The permeated solution was adjusted to pH 7 by the addition of 10 ml of 25% NaOH and subjected to the UF treatment under the same conditions as above to obtain 5 l of concentrate. The concentrate was subjected to a diafiltration treatment while maintaining the liquid volume at 5 l with the addition of deionized water. The electric conductivity of the concentrate became constant when 25 l of deionized water was added, whereupon the addition of deionized water was stopped and concentration was continued to obtain 0.2 l of the target concentrate. The GMP concentrate thus prepared was dried in a spray drier (Pulvis Minispray: trademark, a product of Yamato Science Co.) at a spray pressure of 1.0 kg/cm$^2$ and an exhaust air temperature of 80° C. to obtain 18 gm of GMP powder.

All GMP was prepared in an amount required for the following experiments on use and was prepared according to the above method.

Free amino acid mixtures utilized for the experiment were also prepared with compositions shown in tables 2 and 3.

TABLE 2 composition of a mixture of free amino acids

| Amino Acid | Amount (g) |
|---|---|
| Leu | 238.4 |
| Lys—HCl | 35.6 |
| Met | 42.8 |
| Cys—HCl—$H_2O$ | 129.0 |
| Phe | 128.2 |
| Tyr | 135.1 |
| Trp | 56.9 |
| Arg | 81.9 |
| His—HCl—$H_2O$ | 105.8 |
| Gly | 46.3 |
| Total | 1000.0 |

All of the amino acids other than Gly are L-type

TABLE 3

Composition of a mixture of free amino acids

| Amino Acid | Amount (g) |
|---|---|
| Asp | 67.1 |
| Thr | 118.0 |
| Ser | 60.9 |
| Glu | 162.0 |
| Pro | 88.7 |
| Gly | 18.5 |
| Ala | 41.7 |
| Cys—HCl—$H_2O$ | 27.9 |
| Val | 57.9 |
| Met | 12.3 |
| Ile | 73.3 |
| Leu | 76.9 |
| Tyr | 31.5 |
| Phe | 33.1 |
| Lys—HCl | 64.6 |
| His—HCl—$H_2O$ | 28.0 |
| Trp | 12.3 |
| Arg | 25.4 |
| Total | 1000.0 |

All of the amino acids other than Gly are L-type

By utilizing GMP thus prepared and two free amino acid-mixtures, four nitrogen mixtures of A, B, C, and D were prepared (A: GMP alone, B: a mixture comprising the free amino acid mixture prepared according to the Table 2 and GMP at 15%:85%, C: a mixture comprising a free amino acid mixture prepared according to the Table 2 and GMP at 30%:70%, D: a free amino acid mixture prepared according to the Table 3 alone). These four nitrogen mixtures were evaluated from three viewpoints of (1) flavor, (2) allergenicity, and (3) nutritive value according to the following method.

In order to evaluate flavor and allergenicity, four kinds of milk were prepared by combining each nitrogen source according to the following method. First, to each nitrogen source (100 g), a sugar mixture (605 g) containing sucrose, soluble polysaccharides, and tapioca starch, a mineral mixture (35 g), a vitamin mixture (22 g), and hot water (7l) were added. To the resultant mixture solution, purified vegetable fats (278 g) were added and homogenized. The obtained solution was sterilized, concentrated according to a general method, and finally dried to obtain milk powder (1 kg) utilized for each experiment.

(2) Allergenicity

A milk comprising each nitrogen source was dissolved in hot water to make its concentration 100 mg/ml, and subjected to centrifugation at 5000 rpm for 30 minutes to separate a lower layer (skimmed milk). The skimmed milk (200 μl) was dissolved in physiological saline (10 ml) for sufficient mixing, and intraperitoneally administered to the left abdomen of 10 female Slc:ddY mice (age: 4 weeks) at a dose of 0.5 ml/mouse. DTP (triple vaccine of pertussis, tetanus, and diphtheria, manufactured by Chiba Serum Laboratory) was also intraperitoneally administered to the right lateral abdomen of the same mice at a dose of 0.5 ml. After that, the skimmed milk in saline was further intraperitoneally administered to the mice at a dose of 5 μl/0.5 μml per mouse every week 6 times in total. In 3 days of the final sensitization, blood was sampled from the heart to collect serum.

Specific antibody against milk was tried to detect in the serum according to the double immunodiffusion (Ouchterlony test). However, no antibody was detected. Similar results were obtained when mixtures of skimmed milk and saline were administered at doses of 100 μl and 200 μl/0.5 μml per mouse every week for 3 to 6 weeks. All of the nitrogen sources were considered to have no allergenicity.

(3) Flavor

Sensory evaluation was conducted for flavor of milk comprising each nitrogen source by utilizing 30 panelists (15 women and 15 men of 21–42 years) as subjects. Each milk was dissolved in hot water at 50° C. to make a concentration of 13% (w/v), was cooled to room temperature (20°–23° C.), was dispensed in 50 ml portions in disposable plastic containers, and submitted to the subjects. Each container had a random number label for discrimination. The milk was evaluated by ranking in order of desirable flavor. The same ranking was not allowed to describe. Evaluation sheets were collected and the evaluation point for each sample was statistically analyzed.

The results are shown in Table 4 below. The ranking of sensory evaluation is in order of desirable flavor, with a ranking of one being most desirable.

TABLE 4

| Milk | Panelist (number) | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| A | 1 | 1 | 1 | 2 | 1 | 1 | 1 | 1 | 1 | 3 | 1 | 1 | 1 | 1 | 1 | 1 | 2 | 1 |
| B | 2 | 2 | 2 | 1 | 2 | 3 | 2 | 2 | 2 | 1 | 2 | 2 | 2 | 2 | 2 | 2 | 1 | 2 |
| C | 3 | 3 | 3 | 3 | 3 | 2 | 3 | 3 | 3 | 2 | 3 | 3 | 3 | 3 | 4 | 3 | 3 | 3 |
| D | 4 | 4 | 4 | 4 | 4 | 4 | 4 | 4 | 4 | 4 | 4 | 4 | 4 | 3 | 3 | 4 | 4 | 4 |

TABLE 4-continued

| Milk | \multicolumn{12}{c}{Panelist (number)} | total point of ranking |
| | 19 | 20 | 21 | 22 | 23 | 24 | 25 | 26 | 27 | 28 | 29 | 30 | |
| --- | --- | --- | --- | --- | --- | --- | --- | --- | --- | --- | --- | --- | --- |
| A | 1 | 1 | 1 | 1 | 1 | 1 | 1 | 3 | 1 | 1 | 1 | 2 | 37 |
| B | 2 | 2 | 3 | 2 | 3 | 2 | 2 | 2 | 2 | 2 | 2 | 3 | 62 |
| C | 4 | 3 | 2 | 3 | 2 | 3 | 3 | 1 | 3 | 3 | 3 | 1 | 83 |
| D | 3 | 4 | 4 | 4 | 4 | 4 | 4 | 4 | 4 | 4 | 4 | 4 | 118 |

It was judged by Freedman test that a highly significant difference was present between evaluation results of each milk (p<0.01). According to Tukey's multiple comparison, no significant difference was found between A milk and B milk and between B milk and C milk. D milk had a highly significant difference, as compared to other three ones (p<0.01). From these results, it was concluded that A milk had the most desirable flavor, followed by B and C milks, and no statistically different flavor was found between B and C milk. D milk comprised free amino acids alone as a nitrogen source, and was judged to apparently have a poor flavor as compared to A, B, and C milk.

(4) Nutritive value

Modified AIN-76 purified diets of four kinds with compositions shown in Table 5 were prepared according to the formulation of Oriental Yeast Company. The nitrogen source was selected from A, B, C, and D. Each diet was given to groups of mice (3-week BALB/c male), each group consisting of 10 mice, for five weeks. Changes in body weight for each mouse was measured over time.

TABLE 5

| Composition of diet | |
| --- | --- |
| Component | Amount (g) |
| Nitrogen source | 25.0 |
| Corn oil | 6.0 |
| Corn starch | 41.5 |
| α-starch | 10.0 |
| Cellulose powder | 8.0 |
| Mineral mixture | 3.5 |
| Granulated sugar | 5.0 |
| Vitamin mixture | 1.0 |

*Four diets were prepared by using each of A, B, C, and D nitrogen sources.
**Purchase from Oriental Yeast Company.

The results are shown in FIG. 1. FIG. 1 shows change in the mean body weight for each mouse group with time. As can be seen from FIG. 1, the group A (mice fed with A) developed poor growth. This is considered to be caused by the fact that GMP does not contain some essential amino acids. Group B or C (mice fed with B or C) developed good growth, but group D (mice fed with D) developed poorly as compared to the groups B and C. The reason is considered to be that absorption efficiency in the gastrointestinal tract was reduced because the nitrogen source contained free amino acids alone.

It may be concluded from the above results that the best nitrogen source was B or C from the viewpoint of nutrition, the second one was D, and the worst was A which contained GMP alone as a nitrogen source.

Conclusion

A low allergenic milk should be low allergenic, and have excellent nutritive values and good flavor simultaneously.

Any nitrogen source of A, B, C, and D did not have allergenicity at all.

D milk comprising free amino acids alone as a nitrogen source was judged to have the most poor flavor by the sensory test.

A milk comprising GMP alone as a nitrogen source was judged to have the best flavor by the sensory test, but to have very poor nutrition value as a nitrogen source.

B and C milks were found to meet the requirements such as low allergenicity, good flavor, and high nutritive value at high level.

It is clearly concluded from the above results that the most desirable nitrogen source for a low allergenic milk is a composition comprising GMP at 70–85% and free amino acids, which meets the above requirements in a well-balanced manner.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of providing a low allergenic nutrient composition, comprising the steps of:

preparing a composition which includes 70–85% by weight of Kappa-caseinglycomacropeptide as a primary source of nitrogen;

said composition including 30–15% by weight of at least one member selected from the group consisting L-leucine, L-lysine, methionine, L-cysteine, phenylalanine, L-tyrosine, L-tryptophan, L-arginine, L-histidine, L-valine, L-isoleucine, and glycine; and providing said composition to a person susceptible to allergenic reactions.

2. A low allergenic nutrient composition, comprising:

an amount of Kappa-caseinglycomacropeptide as a nitrogen source, wherein said amount of Kappa-caseinglycomacropeptide is 70–85% by weight; and at least one member selected from the group consisting of L-leucine, L-lysine, methionine, L-cysteine, phenylalanine, L-tyrosine, L-tryptophan, L-arginine, L-histidine, L-valine, L-isoleucine, and glycine which is 30–15% by weight of said composition.

* * * * *